(12) United States Patent
Beasley et al.

(10) Patent No.: US 7,418,524 B2
(45) Date of Patent: Aug. 26, 2008

(54) UNIVERSAL SERIAL BUS (USB) EXTENSION

(75) Inventors: Michael Wyatt Beasley, Owens Cross Roads, AL (US); Gary Warren Shelton, Huntsville, AL (US)

(73) Assignee: Avocent Corporation, Huntsville, AL (US)

( * ) Notice: Subject to any disclaimer, the term of this patent is extended or adjusted under 35 U.S.C. 154(b) by 136 days.

(21) Appl. No.: 11/294,563

(22) Filed: Dec. 6, 2005

(65) Prior Publication Data

US 2007/0239900 A1    Oct. 11, 2007

(51) Int. Cl.
*G06F 3/00* (2006.01)

(52) U.S. Cl. .................... 710/2; 710/5; 710/300

(58) Field of Classification Search .......... None
See application file for complete search history.

(56) References Cited

U.S. PATENT DOCUMENTS

| 6,571,305 B1* | 5/2003 | Engler .......... 710/100 |
|---|---|---|
| 6,618,774 B1 | 9/2003 | Dickens et al. |
| 6,782,443 B2 | 8/2004 | Ferguson |
| 6,922,748 B2 | 7/2005 | Engler |
| 2003/0126337 A1 | 7/2003 | Ferguson |
| 2005/0071733 A1* | 3/2005 | Fukae et al. .......... 714/776 |
| 2006/0123166 A1* | 6/2006 | Toebes et al. .......... 710/106 |
| 2006/0206636 A1* | 9/2006 | McLeod .......... 710/29 |

OTHER PUBLICATIONS

"USB 2.0 Transceiver Macrocell Interface (UTMI) Specification, Version 1.05," Mar. 29, 2001, 1999-2001 Intel Corporation.
Search Report mailed Jul. 23, 2007 in corresponding PCT application No. PCT/US2006/001861.

* cited by examiner

*Primary Examiner*—Alford W Kindred
*Assistant Examiner*—Eron J Sorrell
(74) *Attorney, Agent, or Firm*—Davidson Berquist Jackson & Gowdey LLP

(57) ABSTRACT

A universal serial bus (USB) extension allows for the transmission of data at high speeds over a much greater distance than typical USB operating range. USB devices may be connected to host computers at distances of 750 meters or more. USB tokens from a host computer are spoofed.

24 Claims, 15 Drawing Sheets

Fig. 3

*Token Packet*

| Field | PID | ADDR | ENDP | CRC5 |
|---|---|---|---|---|
| Bits | 8 | 7 | 4 | 5 |

Fig. 4

*SOF Packet*

| Field | PID | FrameNumber | CRC5 |
|---|---|---|---|
| Bits | 8 | 11 | 5 |

Fig. 5

*Data Packet*

| Field | PID | DATA | CRC16 |
|---|---|---|---|
| Bits | 8 | 0 - 8192 | 16 |

Fig. 6

*Handshake Packet*

| Field | PID |
|---|---|
| Bits | 8 |

UNIVERSAL SERIAL BUS (USB) EXTENSION

FIELD OF THE INVENTION

This invention relates to data transmission and, more particularly, to an extended Universal Serial Bus (USB).

BACKGROUND AND SUMMARY OF THE INVENTION

Devices (that is, computer peripherals such as printers, cameras, external storage, and the like) may be connected to a computer using various types of standard connections, one of which is the so-called USB (Universal Serial Bus).

The USB system/standard was designed and intended to support computer peripherals that are physically close to the computer—mostly these devices are expected to be located on the same desk as the computer itself or within the same room as the computer. The USB system is defined by a formal specification, the current version of which is USB 2.0 (dated Apr. 27, 2000), the entire contents of which are incorporated herein by reference. Under the USB 2.0 Specification, the maximum distance from a port on a computer (a so-called root port) to any supported device is thirty meters and is achieved, for example, using a series arrangement of five hubs and six five-meter cable segments.

The inventor has found that for certain applications, however, it necessary or desirable to enable USB functionality at distances greater than thirty meters. For certain applications, USB functionality is desired at distances of at least one hundred meters and preferably at distances of seven hundred and fifty meters or more (for copper and fiber link products respectively).

For example, in a KVM ("Keyboard, Video, Mouse") system, a target or host computer may be controlled and accessed by peripheral devices (possibly connected to another computer) that are possibly located some distance away from the target computer. In such cases, it is desirable to be able to connect all kinds of peripheral devices, including USB devices, to the host computer.

Thus, in at least one aspect, the present invention provides a USB system/extension that allows for the transmission of data over greater distances than contemplated by the USB standard.

BRIEF DESCRIPTION OF THE FIGURES

For a more complete understanding of the present invention and the advantages thereof, reference should be made to the following Detailed Description taken in connection with the accompanying drawings, in which:

FIGS. 3-6 show the formats of various USB packets;

DETAILED DESCRIPTION OF THE PRESENTLY PREFERRED EMBODIMENTS OF THE INVENTION

Figure 1:
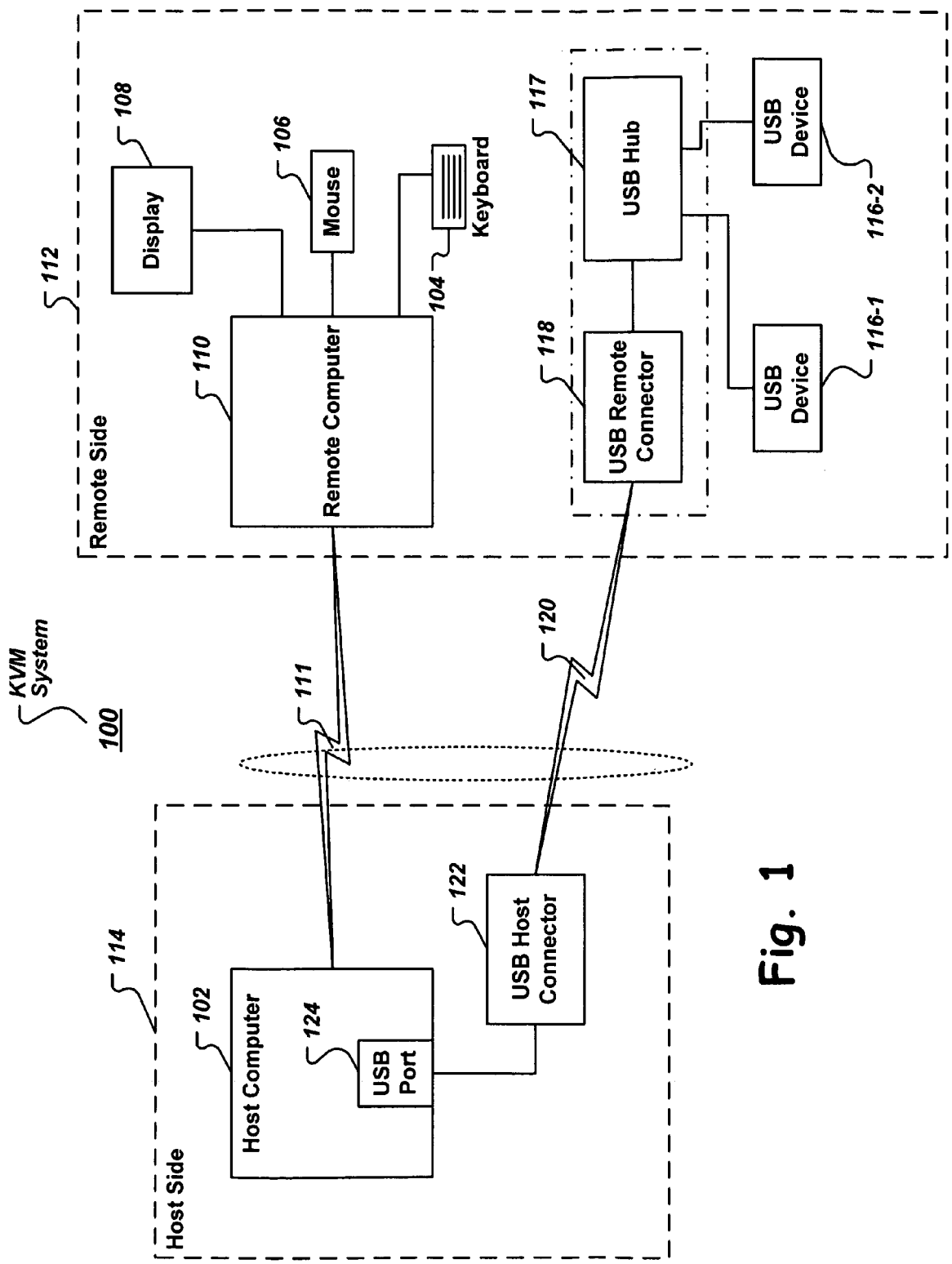
FIG. 1 depicts a typical KVM system in which the USB extension of the present invention may operate.

FIG. 1 depicts a typical KVM system 100 in which the USB extension of the present invention may operate. This system is described only by way of example, and should not be limiting on the invention. One skilled in the art would realize that the invention described may be used in a KVM system such as the one described here or in any other environment in which a USB device is used. As shown in FIG. 1, a host computer 102 is remotely accessed and operated by a remote computer 110. More specifically, a keyboard 104 and mouse 106 connected to the remote computer 110 are used to provide, respectively, keyboard and mouse control signals to the appropriate ports on the host computer 102. The video display output of the host computer 102 is rendered on a video display monitor 108 of the remote computer. The host and remote computers may be connected via, for example, a communication channel 111 which may pass though a known KVM switch (not shown), such as, for example, a KVM switch produced by Avocent Corporation.

For the sake of discussion, it is convenient to refer to the side of the remote computer 110 as the remote side (shown by the dashed line 112 in FIG. 1) and to the side of host computer 102 as the host side (shown by the dashed line 114 in FIG. 1).

In addition to connecting the keyboard 104, mouse 106 and monitor 108 to the host computer (via a remote computer and/or a switch), one or more remotely-located (for example, on the remote side 112) USB devices 116-1, 116-2, . . . may also be connected to the host computer 102. As shown in FIG. 1, the USB devices 116-j are preferably connected to USB hub 117 which connects to a USB remote connector 118 on the remote side 112. The USB remote connector 118 is connected (by a communication channel or link 120) to a USB host connector 122 (on the host side 114). The USB host connector 122 preferably connects to the host computer 102 via its standard USB port 124. As far as the host computer 102 is concerned, it is dealing with a standard USB device. Similarly, each USB device 116-j may be a standard USB device (for example, a computer peripheral such as a printers, camera, external storage, and the like). (The communication link 120 and the communication channel 111 are shown in the drawing as separate channels. In an actual implementation, these logical channels may share the same physical device, e.g., a fiber cable or a CAT5 wire.)

The USB remote connector 118 and USB 2.0 hub 117 may be separate components or may be integral in a single device, such as, for example, a molded cable or connector or the like.

Figure 2:
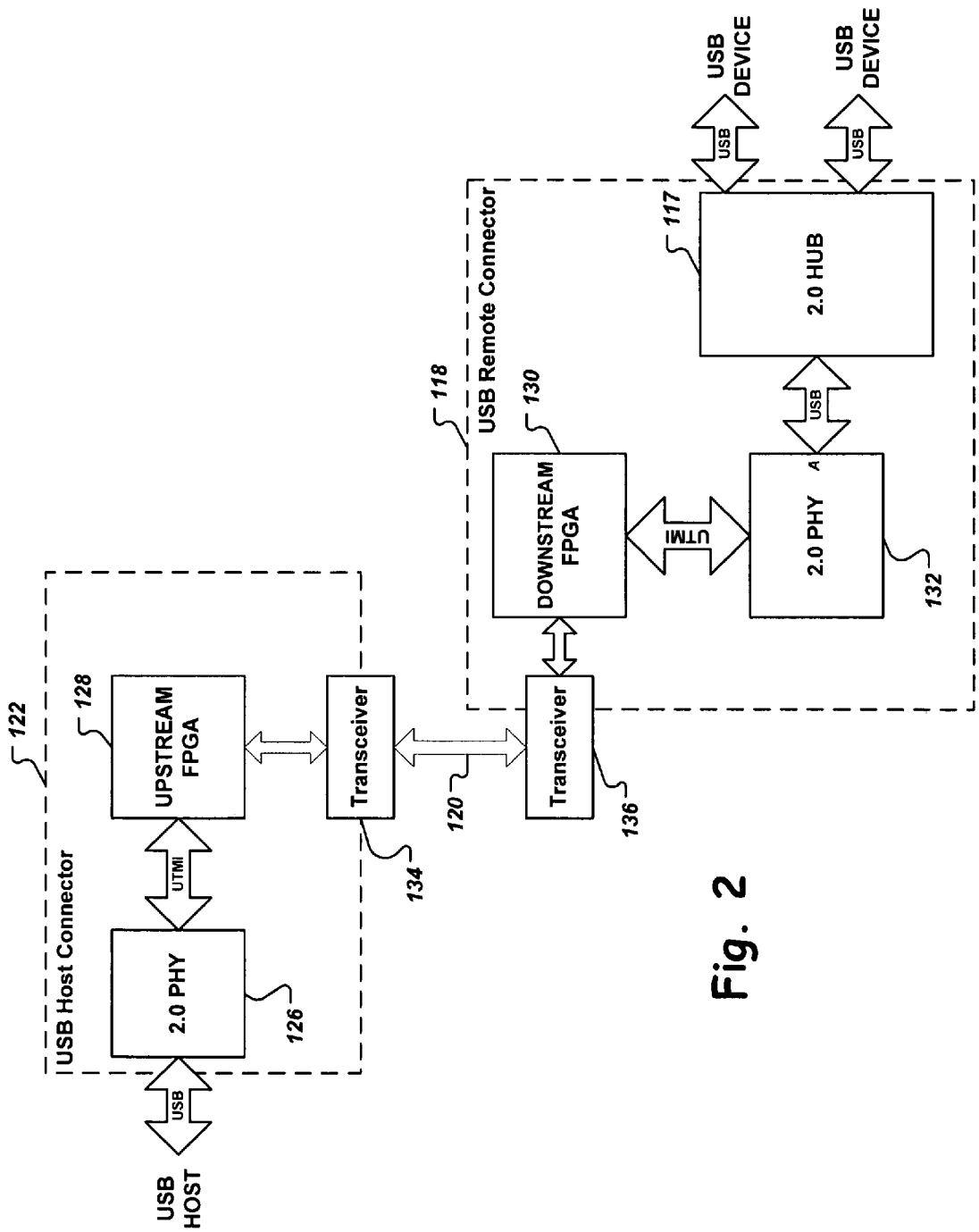
FIG. 2 shows a logical structure of a USB host connector and a USB remote connector according to embodiments of the present invention.

FIG. 2 shows the logical structure of the USB host connector 122 and the USB remote connector 118 according to embodiments of the present invention. As shown in FIG. 2, the USB host connector 122 includes a USB PHY (USB Physical Layer) 126 for connection to a USB port of a host computer. The USB PHY 126 connects to upstream FPGA (Field Programmable Gate Array) 128, preferably via a USB 2.0 Transceiver Macrocell Interface (UTMI) connection. UTMI is defined, for example, in "*USB 2.0 Transceiver Macrocell Interface (UTMI) Specification*," Version 1.05, published by Intel Corporation, Mar. 29, 2001, the entire contents of which are incorporated herein by reference. One skilled in the art will realize that other forms of connection interface, e.g., UTMI Plus, may be used here and are within the scope of the invention.

On the downstream side, the USB remote connector 118 includes a downstream FPGA 130 connected, preferably via a UTMI connection, to a USB PHY 132 which is connected to a USB 2.0 hub 117. Various USB devices may be connected to each of the hub's ports (as shown at "A" in the drawing). Preferably the USB 2.0 hub 117 has one to seven USB ports. Details of the upstream FPGA 128 and downstream FPGA 130 are given below.

The term "host" as used herein generally refers to the host computer system where the USB Host Controller is installed. This includes the host hardware platform (CPU, bus, etc.) and the operating system in use. The terms "upstream" and "downstream" are generally used herein consistent with the USB 2.0 standard. Thus, "downstream" refers to the direction of data flow from the host or away from the host. A downstream port is the port on a hub electrically farthest from the host that generates downstream data traffic from the hub. Downstream ports receive upstream data traffic. Conversely, "upstream" refers to the direction of data flow towards the host. An upstream port is the port on a device electrically closest to the host that generates upstream data traffic from the hub. Upstream ports receive downstream data traffic.

Communications link 120 is preferably a single cable. The communications link 120 may be integrally connected with the USB host connector 122 on one end and the USB remote connector 118 on the other end thereof or it may be constructed and adapted to be connected thereto. The cable may be of various lengths, ranging, in preferred embodiments, from 100 meters to 750 meters. Cable lengths of greater than 750 meters are possible and are contemplated by the inventor using the present invention, but may provide diminished performance for some types of USB devices. In some embodiments, appropriate transceivers (for example, transceivers 134, 136 in FIG. 2) or the like are used on either end of the communications link 120 to facilitate communication over the communications link 120. The transceivers 134 and/or 136 may be integral with the USB host connector 122 and/or USB remote connector 118, respectively, or they may be separate components. For example, the communications link 120 may comprise fiber optic cable and the transceivers 134, 136 may be optical transceivers connecting the upstream FPGA 128 to one of the cable and the downstream FPGA 130 to the other end thereof.

USB 2.0 Transactions

USB 2.0 defines various types of packets (described in greater detail below). The standard USB transaction order is: token packet; optional data packet; and optional response packet.

The USB standard defines strict response deadlines—the deadline for a USB response to a high-speed packet is approximately 1.5 microseconds. The round-trip delay though 750 meters of fiber is about 7.5 microseconds in the fiber media alone (~5 ns per meter each way). Accordingly, in some aspects, this invention provides a mechanism/algorithm to deal with the delays inherent in the length of the communications link 120. The inventor has realized that the round-trip time delay imposed by extension requires that the initial response to any packet transmission that expects a response should be generated on the same side of the link that sent that transmission. This process is referred to herein as the spoofing algorithm.

USB data flow and packet types are strictly defined in the USB specification (for example, in the USB 2.0 Specification at Chapter 8, "Protocol Layer"). There are essentially four types of packets, namely tokens (OUT, IN, SOF and SETUP), data (DATA0, DATA1, DATA2 and MDATA), handshake (ACK, NAK, STALL, NYET) (synchronization) and special (PRE, ERR, SPLIT & PING). All token packets originate inside the host computer and flow downstream toward the device end.

All packets begin with a synchronization (SYNC) field. It is used by the input circuitry to align incoming data with the local clock. A SYNC from an initial transmitter is defined in USB 2.0 to be eight bits in length for full/low-speed and 32 bits for high-speed. Received SYNC fields may be shorter. SYNC serves only as a synchronization mechanism. The last two bits in the SYNC field are a marker that is used to identify the end of the SYNC field and, by inference, the start of the PID.

All USB 2.0 packets have distinct Start- and End-of-Packet delimiters. The Start-of-Packet (SOP) delimiter is part of the SYNC field.

A packet identifier (PID) immediately follows the SYNC field of every USB 2.0 packet. A PID consists of a four-bit packet type field followed by a four-bit check field. The PID indicates the type of packet and, by inference, the format of the packet and the type of error detection applied to the packet. The four-bit check field of the PID ensures reliable decoding of the PID so that the remainder of the packet is interpreted correctly. The PID check field is generated by performing a one's complement of the packet type field. A PID error exists if the four PID check bits are not complements of their respective packet identifier bits.

According to USB 2.0, the host and all functions must perform a complete decoding of all received PID fields. Any PID received with a failed check field or which decodes to a non-defined value is assumed to be corrupted and it, as well as the remainder of the packet, should be ignored by the packet receiver. If a function receives an otherwise valid PID for a transaction type or direction that it does not support, the function must not respond. PID types, codings, and descriptions are listed in the following table (Table 1).

TABLE 1

| PID TYPE | PID NAME | PID<3:0> | DESCRIPTION |
| --- | --- | --- | --- |
| Token | SOF | 0101B | Start-of-Frame marker and frame number |
| Token | OUT | 0001B | Address + endpoint number in host-to-function transaction |
| Token | IN | 1001B | Address + endpoint number in function-to-host transaction |
| Token | SETUP | 1101B | Address + endpoint number in host-to-function transaction for SETUP to a control pipe |
| Data | DATA0 | 0011B | Data packet PID even |
| Data | DATA1 | 1011B | Data packet PID odd |
| Data | DATA2 | 0111b | Data packet PID high-speed, high bandwidth isochronous transaction in a microframe |
| Data | MDATA | 1111B | Data packet PID high-speed for split and high bandwidth isochronous transactions |
| HANDSHAKE | ACK | 0010B | Receiver accepts error-free data packet |
| HANDSHAKE | NAK | 0101B | Receiving device cannot accept data or transmitting device cannot send data |
| HANDSHAKE | STALL | 1110B | Endpoint is halted or a control pipe request is not supported |

TABLE 1-continued

| PID TYPE | PID NAME | PID<3:0> | DESCRIPTION |
|---|---|---|---|
| HANDSHAKE | NYET | 0110B | No response yet from receiver |
| SPECIAL | PRE | 1100B | (Token) Host-issued preamble. Enables downstream bus traffic to low-speed devices. |
| SPECIAL | ERR | 1100B | (Handshake) Split Transaction Error Handshake (reuses PRE value) |
| SPECIAL | SPLIT | 1000B | (Token) High-speed Split Transaction Token |
| SPECIAL | PING | 0100B | (Token) High-speed flow control probe for a bulk/control endpoint |

FIGS. 3-6 show packet formats for token, data, and handshake packets. Fields within a packet are displayed in these figures in the order in which bits are shifted out onto the bus according to the USB 2.0 Specification. One of ordinary skill in the art would realize that the invention is not limited to these orderings, and that embodiments of the invention may be implemented to deal with different packet formats and bit orders.

FIG. 3 shows the field formats for a token packet. A token consists of a PID, specifying either IN, OUT, or SETUP packet type and ADDR and ENDP (endpoint) fields. The PING special token packet also has the same fields as a token packet. For OUT and SETUP transactions, the address and endpoint fields uniquely identify the endpoint that will receive the subsequent Data packet. For IN transactions, these fields uniquely identify which endpoint should transmit a Data packet. For PING transactions, these fields uniquely identify which endpoint will respond with a handshake packet. Only the host can issue token packets. An IN PID defines a Data transaction from a function to the host. OUT and SETUP PIDs define Data transactions from the host to a function. A PING PID defines a handshake transaction from the function to the host.

Token packets have a five-bit CRC (Cyclic Redundancy Check) that covers the address and endpoint fields as shown above. The CRC does not cover the PID, which has its own check field. Token and SOF packets are delimited by an EOP after three bytes of packet field data. If a packet decodes as an otherwise valid token or SOF but does not terminate with an EOP after three bytes, it must be considered invalid and ignored by the receiver.

USB 2.0 defines a special token (SPLIT) for so-called split transactions. This is a four-byte token packet compared to other normal three-byte token packets. The split transaction token packet provides additional transaction types with additional transaction specific information. The split transaction token is used to support split transactions between the host controller communicating with a hub operating at high speed with full-/low-speed devices to some of its downstream facing ports. There are two split transactions defined that use the SPLIT special token: a start-split transaction (SSPLIT) and a complete-split transaction (CSPLIT). A field in the SPLIT special token indicates the specific split transaction.

A high-speed split transaction is used only between the host controller and a hub when the hub has full-/low-speed devices attached to it. This high-speed split transaction is used to initiate a full-/low-speed transaction via the hub and some full-/low-speed device. The high-speed split transaction also allows the completion status of the full-/low-speed transaction to be retrieved from the hub. This approach allows the host controller to start a full-/low-speed transaction via a high-speed transaction and then continue with other high-speed transactions without having to wait for the full-/low-speed transaction to proceed/complete at the slower speed.

A high-speed split transaction has two parts: a start-split and a complete-split. Split transactions are only defined to be used between the host controller and a hub. No other high-speed or full-/low-speed devices ever use split transactions.

According to the USB 2.0 specification, Start-of-Frame (SOF) packets are issued by the host at a nominal rate of once every 1.00 ms±0.0005 ms for a full-speed bus and 125 µs±0.0625 µs for a high-speed bus. SOF packets consist of a PID indicating packet type followed by an 11-bit frame number field as illustrated in FIG. 4. The SOF token comprises the token-only transaction that distributes an SOF marker and accompanying frame number at precisely timed intervals corresponding to the start of each frame. All high-speed and full speed functions, including hubs, receive the SOF packet. The SOF token does not cause any receiving function to generate a return packet; therefore, SOF delivery to any given function cannot be guaranteed.

A data packet consists of a PID, a data field containing zero or more bytes of data, and a CRC of the data, as shown in FIG. 5. There are four types of data packets, identified by differing PIDs: DATA0, DATA1, DATA2 and MDATA. Two data packet PIDs (DATA0 and DATA1) are defined to support data toggle synchronization. All four data PIDs are used in data PID sequencing for high bandwidth high-speed isochronous endpoints. Three data PIDs (MDATA, DATA0, DATA1) are used in split transactions.

According to the USB specification, data must always be sent in integral numbers of bytes. The data CRC is computed over only the data field in the packet and does not include the PID, which has its own check field. The maximum data payload size allowed for low-speed devices is 8 bytes. The maximum data payload size for full-speed devices is 1023. The maximum data payload size for high-speed devices is 1024 bytes.

Handshake packets, as shown in FIG. 6, consist of only a PID. Handshake packets are used to report the status of a data transaction and can return values indicating successful reception of data, command acceptance or rejection, flow control, and halt conditions. Only transaction types that support flow control can return handshakes. Handshakes are always returned in the handshake phase of a transaction and may be returned, instead of data, in the data phase. Handshake packets are delimited by an EOP after one byte of packet field. If a packet decodes as an otherwise valid handshake but does not terminate with an EOP after one byte, it must be considered invalid and ignored by the receiver.

There are four types of handshake packets and one special handshake packet:

ACK indicates that the data packet was received without bit stuff or CRC errors over the data field and that the data PID was received correctly. ACK may be issued either when sequence bits match and the receiver can accept data or when sequence bits mismatch and the sender and receiver must resynchronize to each other. An ACK handshake is applicable only in transactions in which data has been transmitted and where a handshake is expected. ACK can be returned by the host for IN transactions and by a function for OUT, SETUP, or PING transactions.

NAK indicates that a function was unable to accept data from the host (OUT) or that a function has no data to transmit to the host (IN). NAK can only be returned by functions in the data phase of IN transactions or the handshake phase of OUT or PING transactions. The host can never issue NAK.

NAK is used for flow control purposes to indicate that a function is temporarily unable to transmit or receive data, but will eventually be able to do so without need of host intervention.

STALL is returned by a function in response to an IN token or after the data phase of an OUT or in response to a PING transaction. STALL indicates that a function is unable to transmit or receive data, or that a control pipe request is not supported. The state of a function after returning a STALL (for any endpoint except the default endpoint) is undefined. The host is not permitted to return a STALL under any condition.

The STALL handshake is used by a device in one of two distinct occasions. The first case, known as "functional stall," is when the Halt feature associated with the endpoint is set. A special case of the functional stall is the "commanded stall." Commanded stall occurs when the host explicitly sets the endpoint's Halt feature. Once a function's endpoint is halted, the function must continue returning STALL until the condition causing the halt has been cleared through host intervention. The second case, known as "protocol stall." Protocol stall is unique to control pipes. Protocol stall differs from functional stall in meaning and duration. A protocol STALL is returned during the Data or Status stage of a control transfer, and the STALL condition terminates at the beginning of the next control transfer (Setup).

NYET is a high-speed only handshake that is returned in two circumstances. NYET is returned by a high-speed endpoint as part of the PING protocol described later in this chapter. NYET may also be returned by a hub in response to a split-transaction when the full-/low-speed transaction has not yet been completed or the hub is otherwise not able to handle the split-transaction.

ERR is a high-speed only handshake that is returned to allow a high-speed hub to report an error on a full-/low-speed bus. It is only returned by a high-speed hub as part of the split transaction protocol.

Transmitting and receiving functions must return handshakes based upon a specific order of precedence. The order for USB 2.0 is detailed in the following tables (Tables 2-4). Not all handshakes are allowed, depending on the transaction type and whether the handshake is being issued by a function or the host. Note that if an error occurs during the transmission of the token to the function, the function will not respond with any packets until the next token is received and successfully decoded.

Table 2 shows the possible responses a function may make in response to an IN token. If the function is unable to send data, due to a halt or a flow control condition, it issues a STALL or NAK handshake, respectively. If the function is able to issue data, it does so. If the received token is corrupted, the function returns no response.

TABLE 2

Function Responses to IN Transactions

| Token Received Corrupted | Function Tx Endpoint Halt Feature | Function Can Transmit Data | Action Taken |
|---|---|---|---|
| Yes | Don't care | Don't care | Return no response |
| No | Set | Don't care | Issue STALL handshake |
| No | Not set | No | Issue NAK handshake |
| No | Not set | Yes | Issue data packet |

Table 3 shows the host response to an IN transaction. The host is able to return only one type of handshake: ACK. If the host receives a corrupted data packet, it discards the data and issues no response. If the host cannot accept data from a function, this condition is considered to be an error and the host returns no response. If the host is able to accept data and the data packet is received error-free, the host accepts the data and issues an ACK handshake.

TABLE 3

Host Responses to IN Transactions

| Data Packet Corrupted | Host Can Accept Data | Handshake Returned by Host |
|---|---|---|
| Yes | N/A | Discard data, return no response |
| No | No | Discard data, return no response |
| No | Yes | Accept data, issue ACK |

Handshake responses for an OUT transaction are shown in Table 4. Assuming successful token decode, a function, upon receiving a data packet, may return any one of the three handshake types. If the data packet was corrupted, the function returns no handshake. If the data packet was received error-free and the function's receiving endpoint is halted, the function returns STALL. If the transaction is maintaining sequence bit synchronization and a mismatch is detected, then the function returns ACK and discards the data. If the function can accept the data and has received the data error-free, it returns ACK. If the function cannot accept the data packet due to flow control reasons, it returns NAK.

TABLE 4

Function Responses to OUT Transactions in Order of Precedence

| Data Packet Corrupted | Receiver Halt Feature | Sequence Bits Match | Function Can Accept Data | Handshake Returned by Function |
|---|---|---|---|---|
| Yes | N/A | N/A | N/A | None |
| No | Set | N/A | N/A | STALL |
| No | Not set | No | N/A | ACK |
| No | Not set | Yes | Yes | ACK |
| No | Not set | Yes | No | NAK |

SETUP defines a special type of host-to-function data transaction that permits the host to initialize an endpoint's synchronization bits to those of the host. Upon receiving a SETUP token, a function must accept the data. A function may not respond to a SETUP token with either STALL or NAK, and the receiving function must accept the data packet that follows the SETUP token. If a non-control endpoint receives a SETUP token, it must ignore the transaction and return no response.

The Upstream FPGA 128

An implementation of the upstream (or host) FPGA 128 according to embodiments of the present invention is now described with reference to the logical-block diagram of FIG. 7.

The upstream FPGA 128 receives signals (RXD) from downstream, via the transceiver (134 in FIG. 2), using a link receiver (Rx) port 140. Circuitry (a SERDES—serializer/de-serializer, not shown) between the receiver 134 and the link Rx 140 de-serializes the data it receives from downstream to form 9-bit bytes which are passed to the link Rx 140. Similarly, upstream FPGA 128 sends signals (TXD) in the downstream direction (via transceiver 134) using link transmitter (Tx) 142. Data passed downstream via the receiver 134 are first serialized by circuitry (a SERDES, not shown) between the Link Tx 142 the tranreceiver.

Actual USB signals from the host are input to the upstream FPGA 128 (from the USB PHY 126) (shown in the drawing as Udatai and ULines). The USB PHY (Physical Interface) 126 essentially performs a serialization (and de-serialization) of the actual USB serial data that comes off the USB. The USB PHY 126 performs high-speed parallel to serial conversion when it is about to transmit on the USB, and it does the high-speed serial-to-parallel conversion when it receives incoming data from the USB.

Udatai are inbound signals from the USB PHY 126. The Udatai signals are input to USB receiver 144 and the Ulines signals (2 bits) are input to USB host chirp 146. The Udata are passed from the USB receiver 144 to a token checker 148 which passes them via pass-through FIFO 150 to link transmitter 142 which sends them downstream. The pass-through FIFO 150 is used to switch from the clock domain of the FPGA (greater than 60 MHz, preferably at least 62.5 MHz) to the USB 60 MHz clock domain. Since the Udata are passed downstream, at some point a result should be obtained from the downstream end. Accordingly, the upstream FPGA 128 maintains a number of FIFOs to deal with the incoming downstream data. While one FIFO would suffice, in preferred embodiments, the system includes deep FIFOs 152 and shallow FIFOs 154. The deep FIFOs 152 are used to store responses (for example, to IN tokens) that might include data. The shallow FIFOs 154 are used to store acknowledgments (for example, ACK, NAK responses). In one present implementation, there are seven deep FIFOs, each of 577 bytes, and seven shallow FIFOs, each having 15 bytes. The deep FIFO should be able to handle at least 515 bytes in order to deal with 512 byte data from downstream (3 bytes are used for overhead). However, in order to deal with the worst case (i.e., largest possible) block—1024 bytes, in preferred embodiments, each FIFO entry should be 1027 bytes. The invention is not limited to the number or size of the FIFOs in the current implementation. One skilled in the art will realize that the numbers and sizes of the deep and shallow FIFOs depends, in part, on the amount of memory available in the FPGA.

The token check 148 evaluates the current transaction to determine what kind of transaction is being sent and whether or not that transaction has been seen before. If the transaction has not been seen before, it is added to the content addressable memory (TCAM—Token CAM 155) and sent down the link (link Tx 142, via link FIFO 150). TCAM Master 156 selects one of the FIFOs 152, 154 to receive the expected response (when it is received from downstream). TCAM Master 156 selects from deep FIFOs 152 if data are expected back or shallow FIFOs 154 if only acknowledgements are expected back (for example, an OUT token). TCAM Master 156 tracks which FIFOs have been allocated to which tokens.

When data are received on the link receiver 140, the data are input to the appropriate FIFO 152, 154 as designated by a pointer (Xselect) from the TCAM Master 156 via the pointer FIFO 158. Xselect is a bus that contains a pointer that comes out of TCAM Master 156 that indicates where to put a response when one comes back from the downstream. (Split tokens are handled in a similar manner, using SCAM (Split Token CAM) 157 and SCAM Master 159.

The injector 160 is essentially a multiplexing switch (MUX) that selects between one of the FIFOs 152, 154 and an output from the host spoof master 162. Whenever data are received from a FIFO 152, 154, that data represent an actual, real response from the other end of the link. On the other hand, data from the host spoof master 162 (Sdata), represent a spoofed response (according to the spoofing algorithm).

So, when the system spoofs, it directs the injector 160 to use the Sdata from the host spoof master 162 and to send that data (via USB Transmit 164) to the USB host (as UDatao). When the system has a real response in one of the FIFOs 152, 154, that response is picked by the injector 160 and sent to the USB host. Udatao are outbound data to the USB PHY 126.

As noted above, in some current implementations, there are seven deep FIFOs, each of 577 bytes, and seven shallow FIFOs, each having 15 bytes. In those embodiments, the injector 160 is a fifteen-way multiplexer (fourteen ways for the FIFOs 152, 154), and one for the output of the host spoof master 162. In general, if there are N deep FIFOs and M shallow FIFOs, the injector 160 will effectively be an N+M+1 multiplexer.

Figure 8:
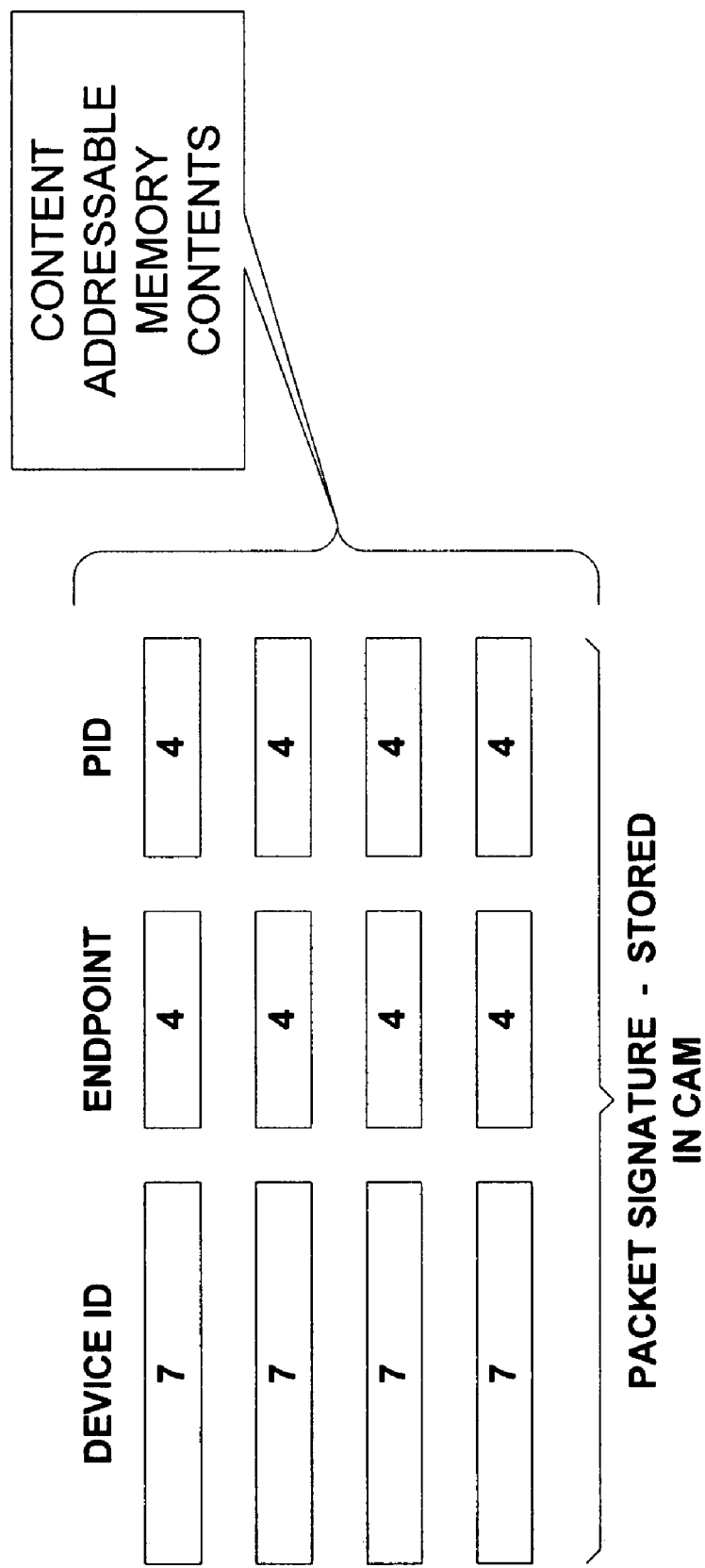
FIG. 8 shows a layout of a content addressable memory (CAM) on the upstream FPGA according to embodiments of the present invention.

In order for the system to associate incoming packets (from downstream) with spoofed packets, a signature for each spoofed packet is stored in the CAM. FIG. 8 shows a layout of a CAM on the upstream FPGA according to embodiments of the present invention. The device id, endpoint and PID fields are derived from the token being spoofed.

The system maintains the status of each entry in the CAM. In preferred embodiments, the system uses two bits to maintain the status of each entry. One status bit is used to indicate whether or not a received packet is new (or already in the CAM). The other status bit is used to indicate whether or not the FIFO is ready (that is, whether or not the FIFO holds an actual response from downstream).

The Downstream FPGA 130

An implementation of the downstream (or hub) FPGA 130 according to embodiments of the present invention is now described with reference to the logical block diagram of FIG. 9.

A downstream FPGA 130 includes a link receiver 170 which connects to a link transceiver (136 in FIG. 2), which, in turn, connects to a cable (for example, to a fiber cable via an optical link) in order to receive signals from the upstream. The link receiver 170 passes incoming data to a pass-through FIFO 172 to host emulator 174. Output from the host emulator 174 is passed to FIFO 176 which passes the data to link transmitter 178. The host emulator 174 also passes data to the HUB USB Transmit 180 which sends it to the USB PHY (132 in FIG. 2) via a physical bus interface 182, which, in turn, provides the data to the hub 117 and then to the device. Host emulator 174 also receives USB device data via the physical bus interface and USB Receiver 184.

According to the USB 2.0 specification, a high speed capable device (such as, for example, a high-speed capable hub) advertises its high speed ability during the USB reset time by emitting a series of short chirp signals directed upstream. After doing so, it then listens for a response from the upstream controller. An upstream full-speed only USB controller will completely ignore these incoming chirps, but a high-speed capable one should shift into high-speed mode and respond with its own distinctive chirp sequence to notify the downstream device that it too is ready for high speed communications. This ritual exchange is called the "High-speed Detection Handshake" and is described in the USB 2.0 specification. If the handshake ritual is not completed then both ends remain in full-speed or low-speed (USB 1.1 compatible) mode.

In preferred embodiments of the present invention, the USB host chirp 146 (FIG. 7) and the USB hub chirp 183 (FIG. 9) are used to perform aspects of this handshake. The handshake differs from the usual one in that the chirp response pulse train sent as a response to the USB Hub lasts longer than usual because it does not end until it gets a signal from the host end indicating that is has some real chirps from the host PC. In other aspects, it follows the standard protocol.

Spoofing

A spoofing algorithm/mechanism according to embodiments of the present invention is now described in greater detail with respect to its operation on certain tokens. In the description that follows, the term "spoofer", "spoof mechanism" and "spoof master" are used interchangeably to refer to the circuitry constructed and adapted to carry out aspects of the spoofing algorithm described herein. As described in greater detail below, the spoof algorithm is preferably implemented in FPGAs on the host and hub ends.

SOF Tokens

The SOF token does not elicit any response from the hub/device end. As many as two consecutive SOF packets may be missed due to bit errors and the hub will still send the SOFs to its own downstream ports at the correct time. The arrival time of all incoming SOF packets at the hub itself is important and needs to be tightly controlled, but this is unrelated to spoofing. Accordingly, as far as the spoofing logic is concerned, SOF packets can be sent downstream without any further action.

OUT Tokens

Figure 10:
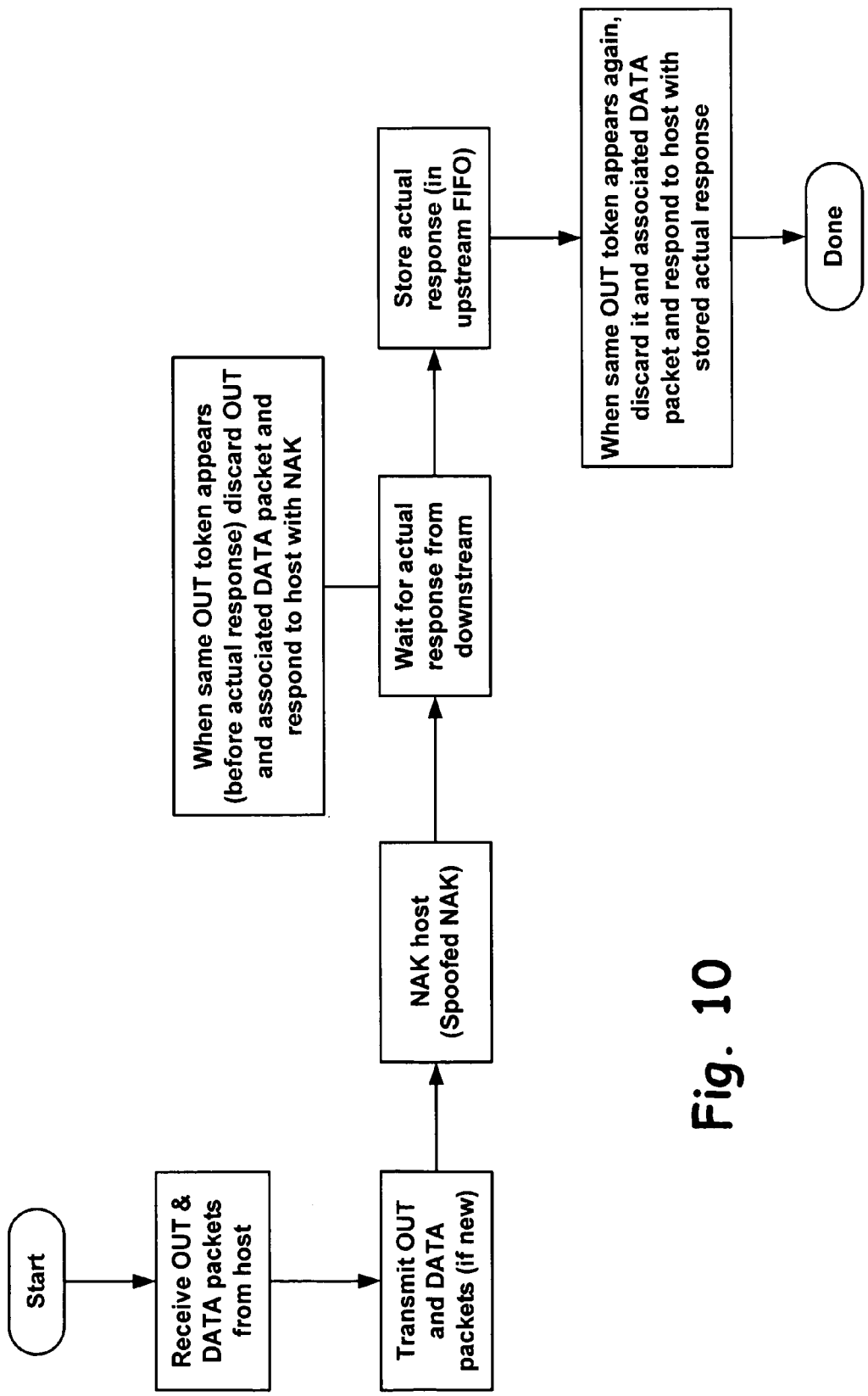
FIGS. 10-15 are flowcharts and example data flow diagrams showing the operation of the spoofing algorithm according to embodiments of the present invention.
Figure 14:
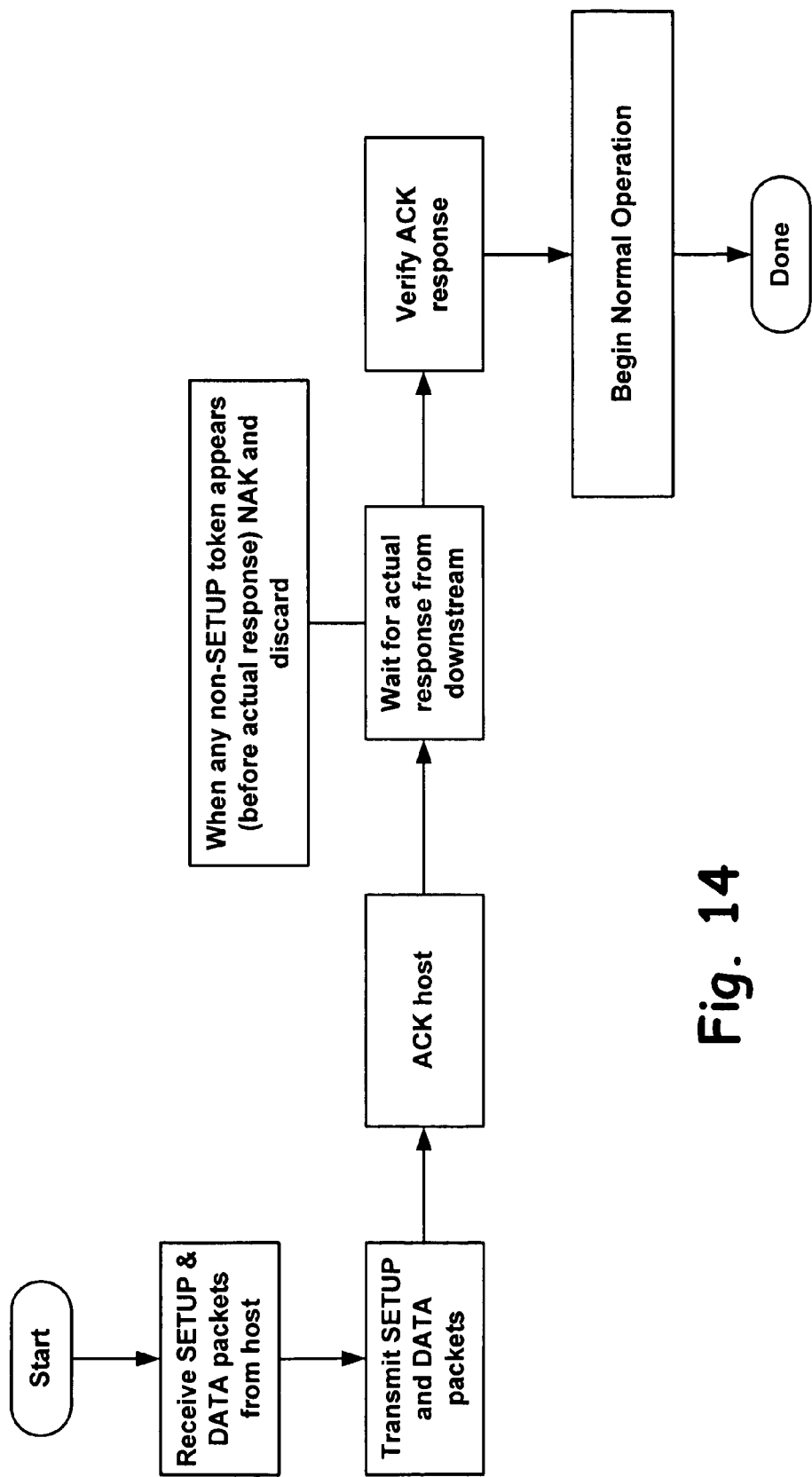

An OUT token packet indicates that the immediately following data packet will transfer data to an endpoint destination on the hub/device end. A DATA packet sent toward the device end will follow the OUT packet, and the device will normally acknowledge the data with a handshake ACK packet, unless there has been corruption of either of the packets, in which case no acknowledge packet will be returned. Thus, the valid responses to an OUT packet from the hub end of the link are: no response, STALL, ACK (acknowledge), and NAK (negative acknowledge). The spoofer at the host end has no way to know or guess which one of these four possibilities will eventually be returned, but it must fake (spoof) some kind of response to the host before the USB timeout deadline or the host will conclude a "no response" has occurred. When the host receives a NAK, it will resend the OUT and the same DATA. Accordingly, for OUT packets, the spoofing scheme performs the following (with reference also to the flow diagram in FIG. 10):

1. Ship both packets (OUT and DATA) downstream (if they are "new" and have not already been sent). A token is considered to be "new" if it is not stored in the CAM. If the token is new, it is stored in the CAM and sent.
2. NAK the host (this is a spoofed NAK).
3. Wait for the actual response from downstream.
4. When an actual response arrives from downstream, store that actual response, preferably in an indexed memory (FIFO) (for example, as described below with reference to FIG. 14).
5. When the host tries to send the same OUT token again, discard (and do not send) the OUT or the associated data packet, if an actual response has been received, retrieve the actual response (that was stored in step 4) and respond to the host with the stored answer. Now clear the CAM entry so that future responses from the host will be considered new and go through. If the host tries to send the same OUT/DATA before an actual response is received (and stored), respond to the host with a (spoofed) NAK. (The upstream FPGA effectively acts as a gatekeeper, deciding which tokens will be passed downstream and which will be discarded.)

The host is thus falsely informed that the address/endpoint cannot accept the data, meanwhile that data is actually being delivered. The actual status of that delivery will be provided to the host as soon as it is known and asked for by the host again. Note that the host cannot distinguish between a spoofed response and a real response from downstream.

Figure 7:
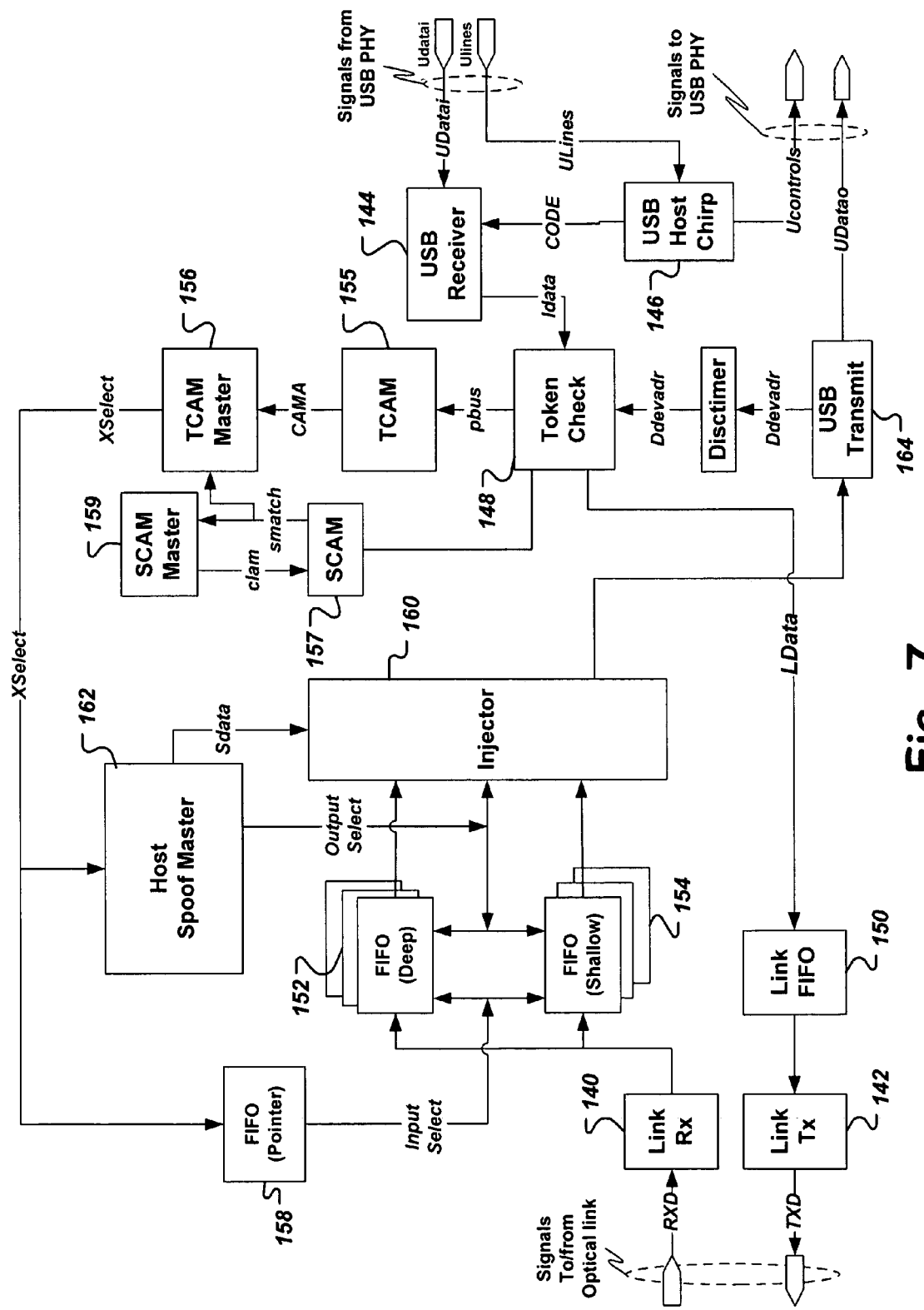
FIG. 7 is a logical block diagram of an implementation of an upstream or host FPGA according to embodiments of the present invention.

With reference to FIG. 7, when an OUT token is received by the USB receiver 144 of upstream FPGA 128, the token and associated data are sent downstream (via Link FIFO 150) and Link transmitter 142. The token check 148 determines that this is an OUT token and the TCAM Master 156 determines whether or not this token has been seen before (i.e., is it new or not). If needed, for a new entry, a CAM entry is allocated to this token and a space in the shallow FIFO 154 is allocated for the anticipated reply from downstream. The shallow FIFO 154 is used because the expected response to an OUT token will not include any data. At some time before the timeout period, the host spoof master 162 sends a spoofed NAK back to the host. When the actual response arrives from downstream, it is matched with the CAM entry and stored in the shallow FIFO 154. When the USB device next sends the same OUT token, the token and its associated data are discarded and the actual response to the original OUT token (now stored in the shallow FIFO 154, and addressable via data on the output select bus (FIG. 7)) is passed to the host. At that time the FIFO location in the shallow FIFO 154 can be released back to the system.

If an OUT/DATA pair eventually receives a NAK as the actual response from downstream, the host will retry the same OUT/DATA pair. Note, however, that this "OUT/DATA" pair will be considered "new" (not seen before), because there will be no corresponding entries in the CAM. In such cases, the "OUT/DATA" pair of tokens will be sent downstream by the FPGA (which will create new CAM entries for them).

Figure 9:
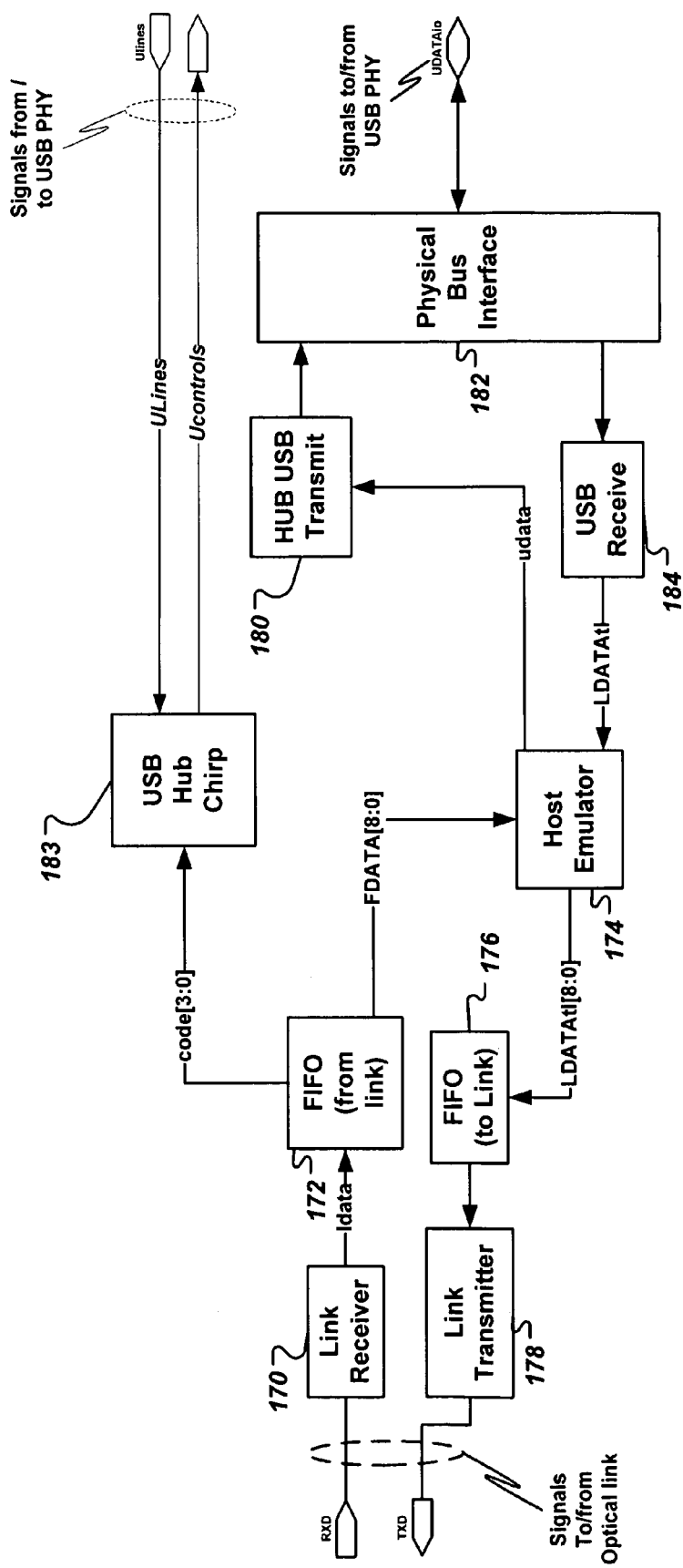
FIG. 9 is a logical block diagram of an implementation of a downstream (or hub) FPGA according to embodiments of the present invention.

On the downstream side, with reference to FIG. 9, when the downstream FPGA 130 receives an OUT token and associated DATA token, it passes them to the USB 2.0 hub which, in turn, provides them to the appropriate USB device.

Figure 11:
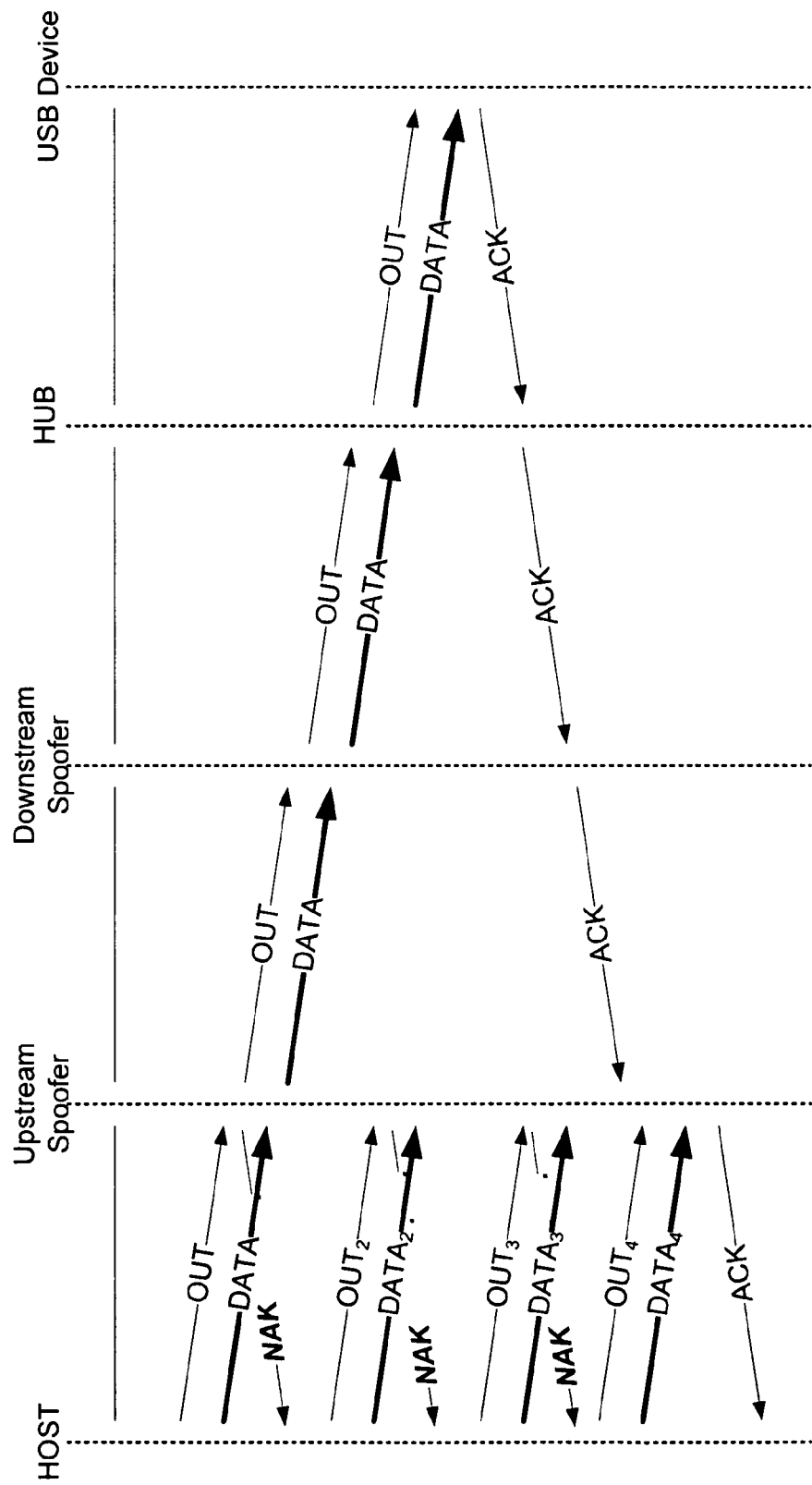

An example of the operation of an embodiments of the present invention with an OUT token is shown in the data flow diagram in FIG. 11. An OUT and associated DATA token are received from the host at the upstream FPGA 128. The upstream spoofer passes both tokens downstream and issues a NAK to the host. (In the diagram, the spoofed token is shown in a bold, italicized font.) Because it received a NAK, the host issues the same OUT and DATA tokens again (denoted $OUT_2$ and $DATA_2$ in the drawing). Since the upstream FPGA 128 has not yet received a real response from downstream, it issues another NAK to the host. Once again, because it received a NAK, the host issues the same OUT and DATA tokens again (denoted $OUT_3$ and $DATA_3$ in the drawing). In the meantime, the downstream has received the OUT and DATA and returned an ACK. Now, when the host again re-issues the OUT and DATA tokens, the upstream FPGA can return the actual ACK to the host.

FIG. 11 (as are the other flow diagrams) is a simplified diagram. One skilled in the art will realize that other USB traffic (not shown in the drawings) may be active at this time. For example, SOFs or activity to other USB devices may take place between some of the tokens shown. (The "OUT/DATA" pairs are indivisible, but other, unrelated, USB activity can take place between the indivisible tokens.) For example, in FIG. 11, the host may send one or more tokens to other devices between $DATA_2$ and $OUT_3$.

IN Tokens

Figure 12:
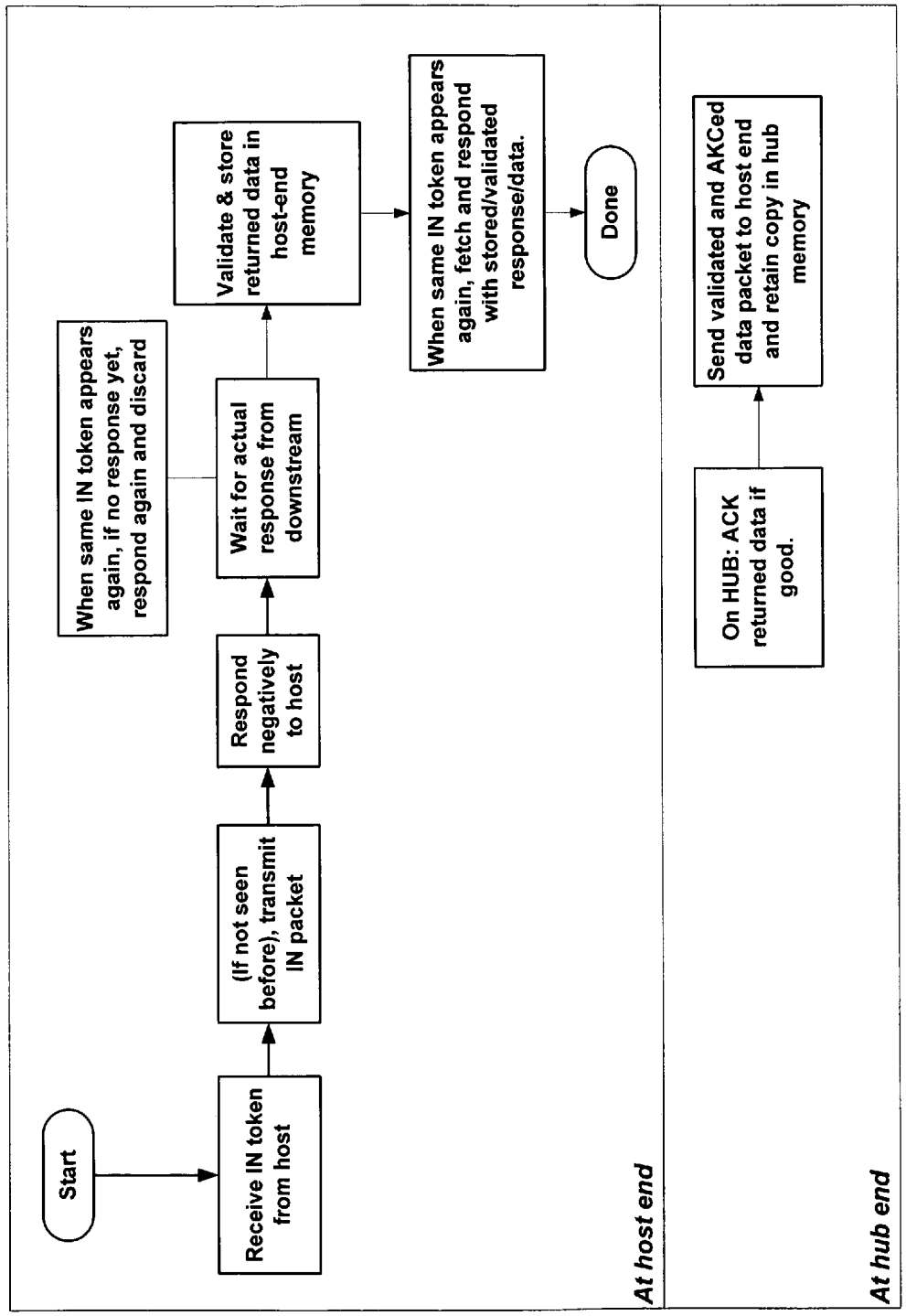

An IN token is similar to an OUT token, but an IN token is not followed by a DATA token, and the command is for data to be returned by the targeted address/endpoint of a device on the far end (downstream) of the link. The spoofing algorithm (with reference also to the flowchart in FIG. 12) performs the following:

1. Transmit the IN token (if it is new and has not already been sent), and remember the token (for example, in the CAM).
2. Spoof the host with a negative acknowledgement. This may be done, for example, by sending a NAK to the host (with a spoofed NAK) or by sending the host known bad data.
3. Wait for the returned data/actual response (from downstream).
4. [On hub end] ACK the returned data if its good, else give no response. (The data are considered good if the CRC check is okay.)
5. Send the validated and newly ACKed (acknowledged) data packet to host end, but retain a copy in hub end memory. In some embodiments a copy is retained in case there is a need to resend, for example, because of a transmission error.
6. Validate and store that returned data (that is, the actual response) in (preferably an indexed) memory on the host end.
7. When that same IN token appears again [at some time in the future], fetch and respond with that stored validated data (actual response).

If the same IN token appears again before an actual response has been received, send a negative acknowledgement to the host and discard the token. The negative acknowledgement may be in the form of a NAK to the host (with a spoofed NAK). Alternatively, the host may be delayed by sending the host known bad data.

The host is falsely told that the address/endpoint cannot return the requested data, meanwhile that data are actually being fetched. The real data or the status of that fetch effort will be presented to the host as soon as it is known and asked for by the host again. In some embodiments, instead of (or as well as) sending a spoofed NAK, the upstream FPGA 128, while waiting for a real response from downstream, may send known bad data to the host (see, for example FIG. 13(b)). For example a 512 byte block of data with a bad CRC can be sent instead of a spoofed NAK. When the host decodes data with a guaranteed bad CRC, the host will throw the data away and ask again for the data. Thus, this known bad data will cause the host to delay (at least as long as it takes to receive the data and realize that the data are bad). (Note that the delay caused by the bad data is mostly caused by transmission of the data to the host.) Such a system can be used in combination with the spoofed NAKs. In some embodiments, a spoofed NAK may be sent if it is early in the microframe, and known bad data are sent if it is late in the microframe. In some embodiments, the size of the known bad data can be determined based on the size of a typical data block from the downstream device. So, for example, if a USB camera always sends a 512 byte packet of data, the spoofer will detect that and use that size packet for the bad data. In other words, the system can track the longest good data packet from a given endpoint and use that length for the size of the spoofed bad data packet.

Note that the returned data can be up 1027 bytes in length [PID, 1024, 2 byte CRC] and at least that much free storage space must be available on the host side. Note also that there are only two possible responses from the host: ACK and no response. According to the USB 2.0 specification, hosts will never issue NAK or STALL packets but are allowed to not respond, either due to detection of packet corruption or internal buffer conditions.

One skilled in the art will realize that it is within the scope of the invention to use only NAKs or only bad data or a combination thereof in order to cause the host to resend the tokens until the actual response is received from downstream. In general, the host needs to believe that it is communicating with a USB device, and the use of a spoofed NAK or bad data to delay the host are both acceptable. When multiple high-volume USB devices (for example, a camera and a USB memory) are both connected to the downstream hub, it may be preferable to use bad data rather than NAKs to delay the host.

With reference to FIG. 7, when a new IN token is received by the USB receiver 144 of upstream FPGA 128, the token is sent downstream (via Link FIFO 150) and Link transmitter 142. A CAM entry is allocated to this token and a space in the deep FIFO 152 is set aside for the anticipated reply from downstream. Unlike for the OUT token, here the deep FIFO 152 is used because the expected response to an IN token may include data. At some time before the USB timeout period (that is, before the host will timeout) the host spoof master 162 sends a spoofed response back to the host (a spoofed NAK or known bad data, as described above). When the actual response arrives from downstream, it is matched with the CAM entry and stored in the deep FIFO 152. When the USB device next sends the same IN token, the token is discarded (that is, not sent downstream) and the actual response to the original IN token (now stored in the deep FIFO 152, and addressable via output select bus (FIG. 7)) is passed to the host. At that time the FIFO location in the deep FIFO 152 can be released back to the system.

On the downstream side, with reference to FIG. 9, when the downstream FPGA 130 receives an IN token, it passes it via the 2.0 PHY (132, FIG. 2) to the USB 2.0 hub (117, FIG. 2) which in turn passes the appropriate USB device. When the device generates a reply, that reply is sent upstream. However, since the device may, itself, need a response from the host, the host emulator 174 sends the device a spoofed ACK (if the data are good), otherwise it gives no response. (The data are considered good if the CRC check is okay.) In addition, in some embodiments of the present invention, the downstream FPGA 130 may keep a copy of the validated and newly ACKed (acknowledged) data packet in hub-end memory. In some embodiments of the present invention, this data can be released up receipt of a "Got It" message from the upstream FPGA 128.

Figure 13A:
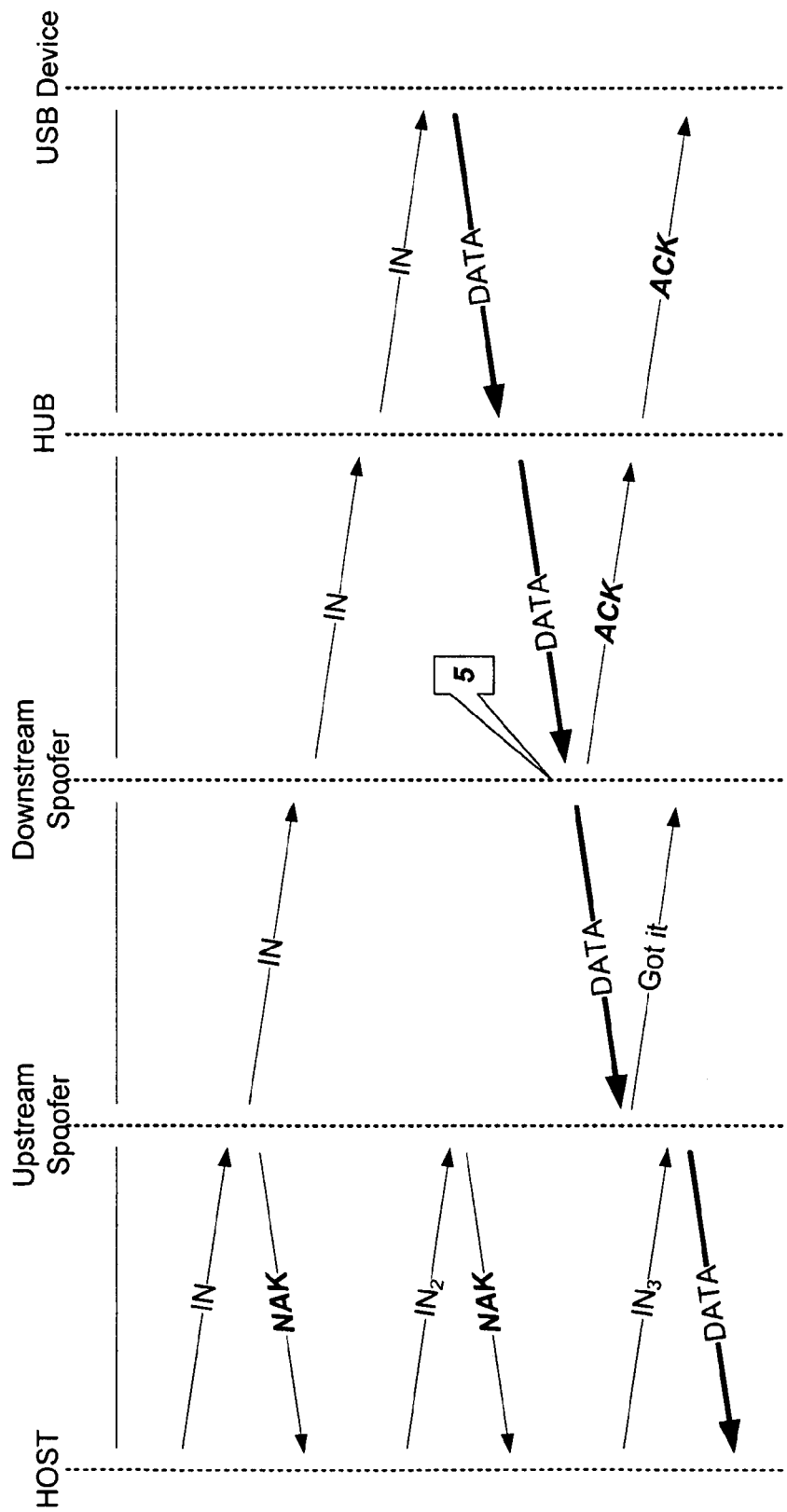
Figure 13B:
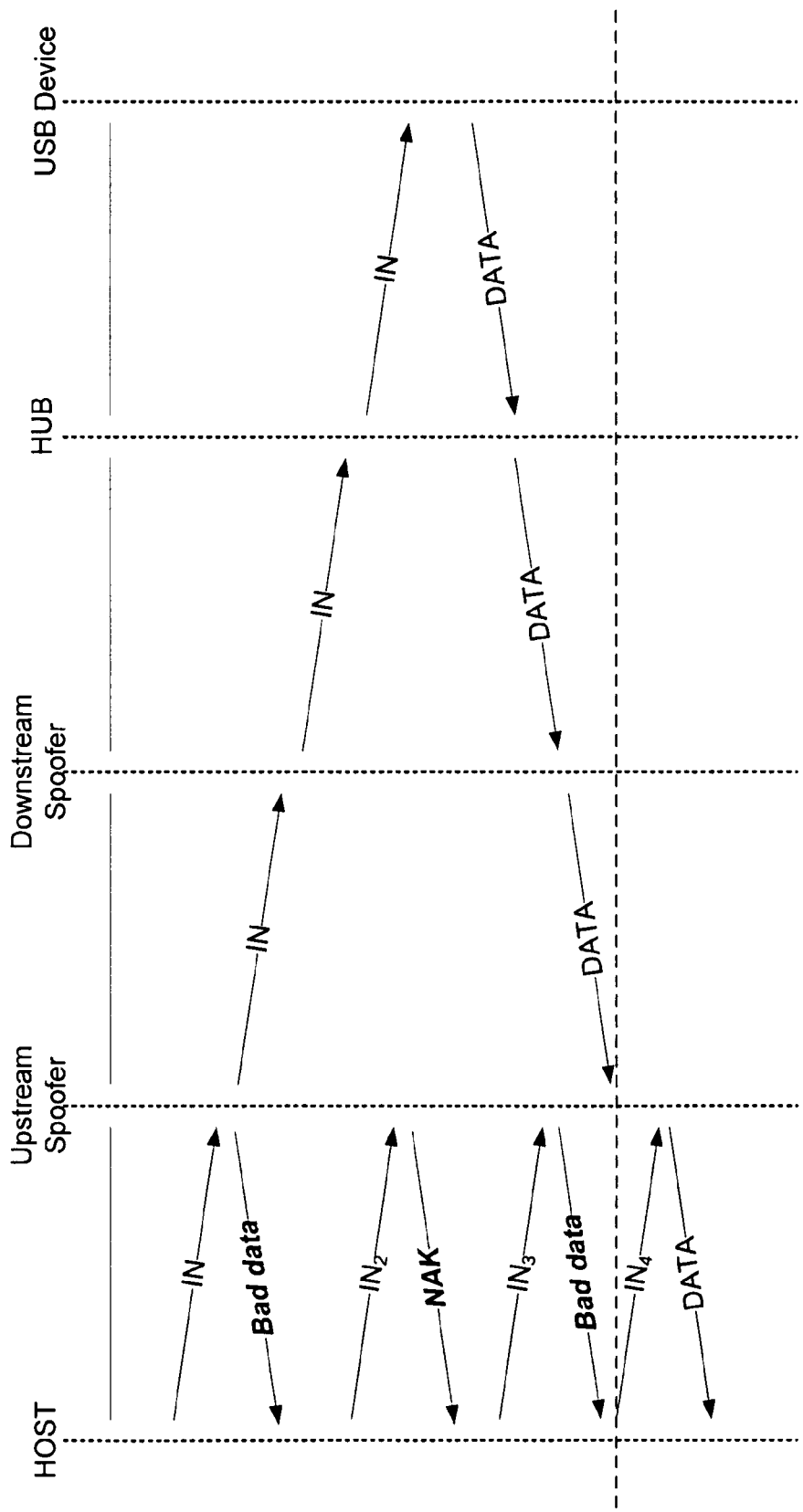

An example of the operation of the system with an IN token is shown in the data flow diagram in FIG. 13(a). The first IN token is received from the host by the upstream FPGA 128 and is sent downstream (since it has not been seen before). Room is set aside in the deep FIFO to receive the expected data from downstream. The upstream FPGA 128 sends a spoofed NAK to the host. When the next IN (denoted $IN_2$ in the drawing) is received from the host, it is discarded (because it is the same as one already being processed) and a spoofed NAK is again sent to the host. In the meantime the downstream device has responded to the IN token with DATA. Note that the actual data received from the USB device may be real data or it may be meta data (such as a NAK from the downstream device). As noted above, the host does not (cannot) distinguish between real NAKs and spoofed NAKs. (The reference "5" in the drawing corresponds to step 5 of the spoofing algorithm described above.) The downstream spoofer (host emulator in downstream FPGA 130) sends a spoofed ACK downstream. When the data reach the upstream FPGA 128, they are matched with the appropriate FIFO location and stored there. When the host next sends the IN token (denoted $IN_3$ in the drawing), the DATA from the deep FIFO is sent to the host.

Another example of the operation of the system according to embodiments of the present invention is shown in FIG. 13(*b*), wherein, in response to an IN token, the upstream FPGA may send known bad data to the host (instead of a NAK token). The bad data will cause the host to re-issue the IN token, as described above.

In some embodiments, for example, as shown here, the data from the USB device (if good data, that is, if it passes the CRC) is also stored on the downstream FPGA 130. In such cases, the upstream FPGA 128 will send the "Got It" meta token downstream to inform the downstream FPGA 130 that it can release the stored data.

SETUP Tokens

SETUP token packets are like OUT packets (including that they are followed by DATA packets), except they cannot be NAKed (negatively acknowledged). SETUP tokens must be acknowledged by the host spoofer if they are valid, but must be delivered without fail to their destination device/endpoint even if errors occur. Accordingly, for SETUP packets, the spoofing scheme performs the following (with reference also to the flowchart in FIG. 14):

1. Transmit both packets (SETUP and associated DATA) and validate and store both.
2. If both packets are good (that is, the CRC succeeds), ACK the host (with a spoofed ACK).
3. Wait for the actual response from the hub end (either an ACK or a no response) meanwhile NAK any new non-SETUP packets and send nothing new downstream.
4. If an ACK is received from the hub, return to normal packet processing else re-send both SETUP packets and try again.

Note that SETUP packets must be ACKed (if valid), but must be delivered without fail to their destination device/endpoint even if errors occur.

In some embodiments of the present invention, step 3 may be modified as follows: Instead of simply waiting indefinitely for a real ACK from downstream device (in response to the SETUP), the system tries to resend the SETUP one or more times (after appropriate delays). If no response is received after multiple attempts, a STALL token is sent to the host for this device. These embodiments allow the system to deal with a failure of one of multiple USB devices connected to a hub. Otherwise a SETUP token sent to a failed device would cause the system to freeze, not allowing any more tokens to any other devices. Note that for these embodiments it is necessary for the upstream FPGA to save a copy of the SETUP token until the real ACK has been received—the host will not resend the SETUP token because it has received the spoofed ACK.

Figure 15:
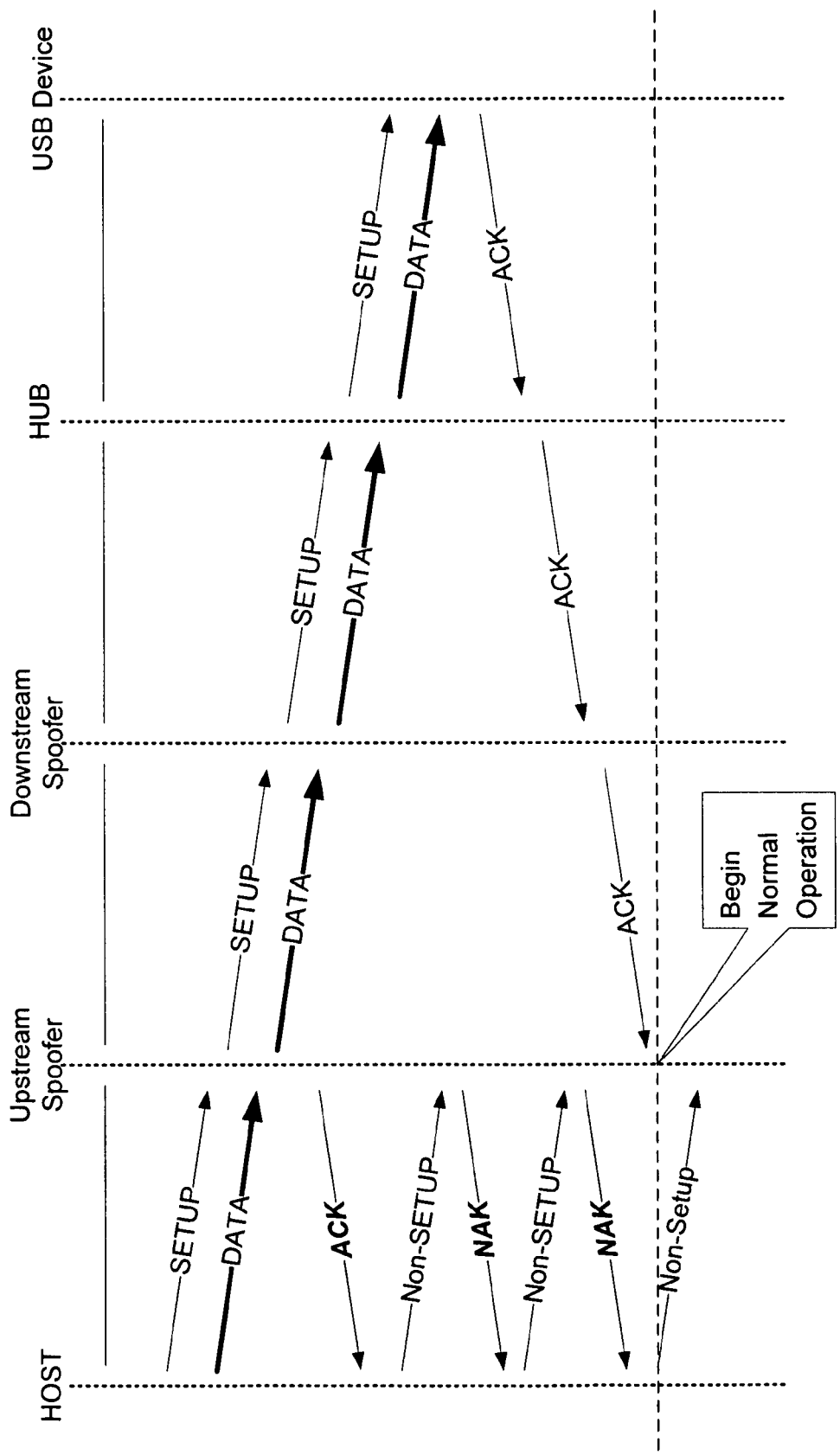

FIG. 15 is an example of the operation of embodiments of the present invention with a SETUP token.

Figure 16:
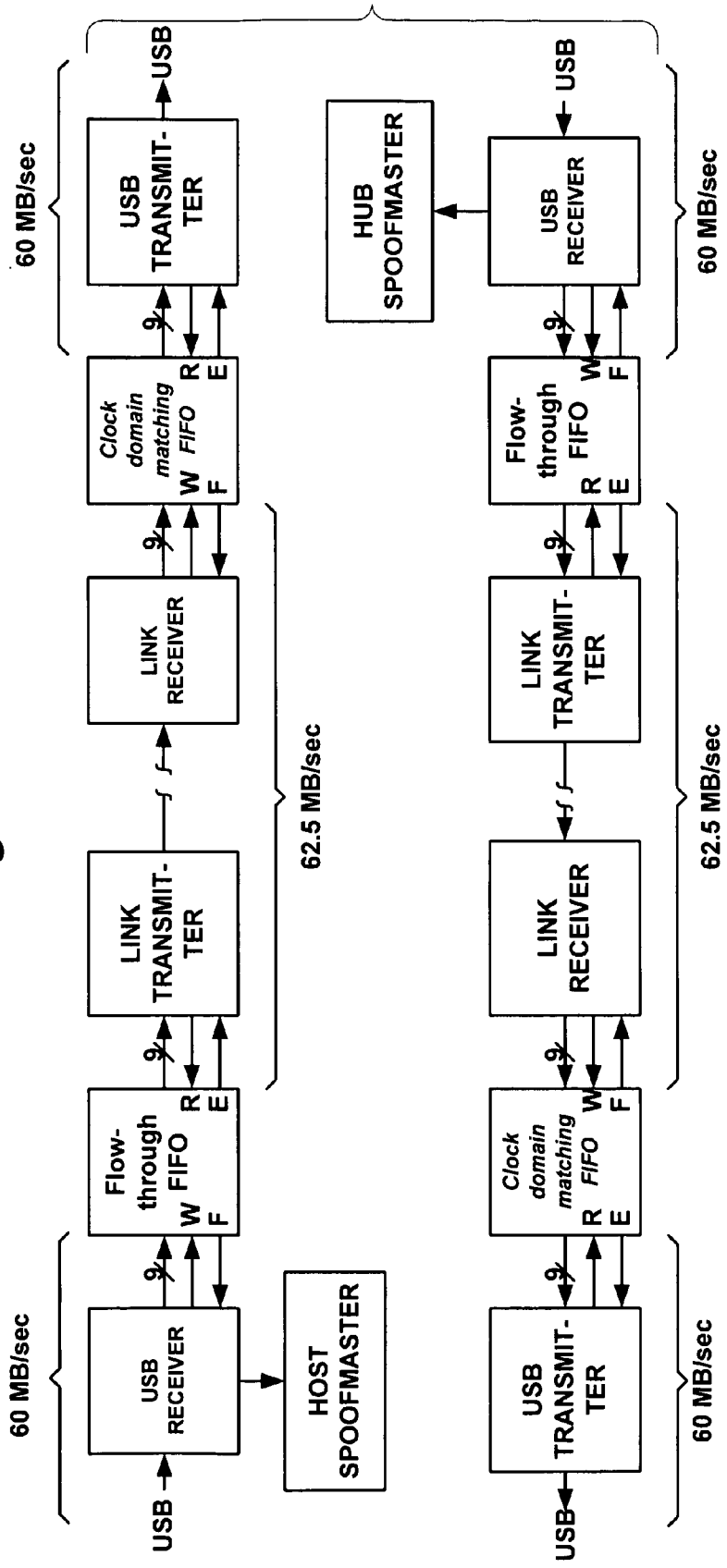
FIG. 16 shows the logical flow of the data through a system according to embodiments of the present invention.

An example of USB 2.0 packet flow is shown in the block diagram in FIG. 16. On the USB side, the system operates at 60 MHz (60 Mbit/Sec.). Flow-through FIFOs are used to switch to a faster clock domain. In preferred embodiments, the second domain operates at 62.5 MHz.

Packaging

As noted above, the various components of the present invention may be packaged in a number of ways. For example, the upstream and/or downstream components may each be packaged together with an appropriate transceiver. Likewise, the cable connecting the upstream host to the downstream transceiver may be a separate component or it may be integral with the other components in some appropriate housing (for example, a molded cable or the like).

Cable Length

As noted above, the communication channel or link 120 may be of various lengths, ranging, in preferred embodiments, from 100 meters to 750 meters. Cable lengths of greater than 750 meters are possible and are contemplated by the inventor using the present invention, but may provide diminished performance for some types of USB devices.

Figure 17:
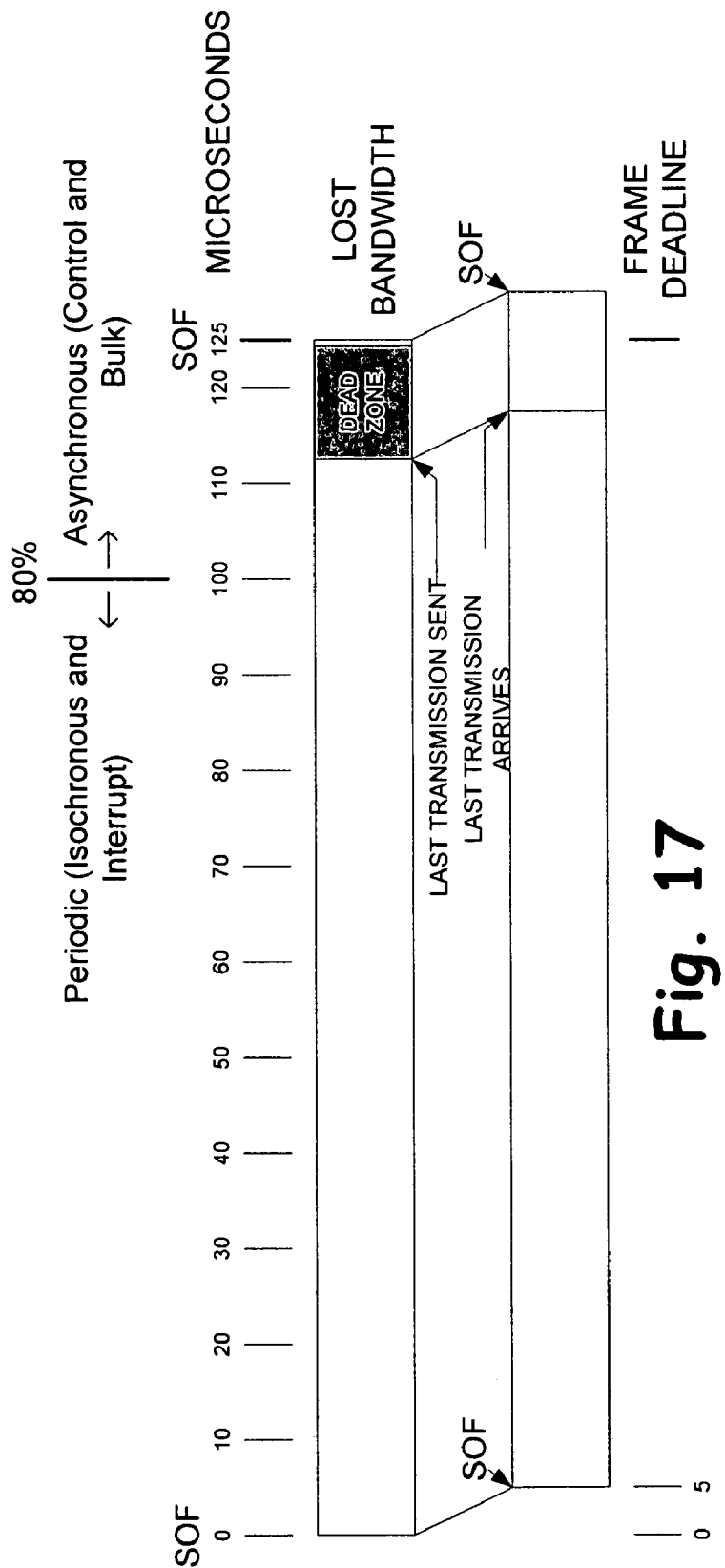
FIG. 17 shows the format of a USB 2.0 microframe.

FIG. 17 shows the format of a USB 2.0 microframe. One skilled in the art will realize that the length of the communication link 120 is related to the timing requirements of the USB microframe, since the microframe is used to synchronize the timing of the upstream end with the downstream end. Preferably the delay in the transmission is substantially constant and the hub end can rely on receiving an SOF indicator about every 125 microseconds (within a tolerance of ±0.0625 µs for a high-speed bus). The link must be of such a length that timing information on the hub end can be obtained from the successively arriving microframes. At the same time, some percentage of the microframe time will be lost to overhead, that is, to transmission time and to time used by the logic circuitry on either end.

Thus, one skilled in the art will realize that the length of the communications link 120 is a function of the delay in the link, the overhead of the processors and the acceptable loss due to overhead. For example, with an optical cable having a delay of 5 ns/meter (one way, 10 ns/meter round trip), a 750 meter cable would give a 7.5 microsecond round-trip delay. Even with 1.5 microseconds for processing overhead, the total overhead is less than 10% of the microframe.

If the communications link 120 is extended to a length the does not allow overlapping microframes (that is, does not allow synchronization using the microframes, then an asynchronous scheme must be used with a local time generator on the hub end.

Embodiments of the invention may use singlemode or multimode fiber cable for the communications link 120. Regular quality multimode fiber cable allows lengths of about 550 meters. Premium quality multimode fiber cable allows lengths of 750 meters or greater. If copper cables, e.g., CAT5 cables, are used, cable lengths of about 100-120 meters should be achieved.

EXAMPLE

A system according to embodiments of the present invention was built connecting a USB camera and mouse to a USB hub. The USB hub was connected to a USB 2.0 PHY which connected to the downstream FPGA. The downstream FPGA was connected via a pair of optical transceivers, using a 750 meter optical cable, to the upstream host FPGA which connected to a USB 2.0 PHY and then to a USB port on a host computer.

In some embodiments, it may be necessary to deliver packets in a deterministic or at least bounded manner. For instance, SOF packets should be delivered within ±62 ns of the ideal arrival time with respect to last one received (125 microseconds earlier). In such embodiments, a packet scheduling scheme may be used, with SOF getting highest priority.

For packet types other than SOF it may be desirable to know the worst-case additional latency due to packet contention with non-USB traffic. Accordingly, in some embodiments, time may be added on to the no-response time limit that the spoofing logic will need to count up to before it gives up on the other side.

In some embodiments may be desirable to actually measure link round trip delay prior to first use for the purpose of setting that timeout value as low as possible to maximize performance.

The present invention was described in some aspects with reference to a KVM system. One skilled in the art will immediately realize that the present invention is not limited to operating in such a system.

The present invention was described in some aspects with reference to the USB 2.0 standard. One skilled in the art would immediately realize that the invention will work with other USB standards and is not limited to the USB 2.0 standard.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A method of communicating with a universal serial bus (USB) device connected to a host computer, the method comprising:
    sending USB packets via an upstream mechanism to the USB device from the host computer;
    at said upstream mechanism, maintaining a list of sent USB packets;
    sending at least some spoofed responses from the upstream mechanism to the host computer;
    waiting for actual responses from the USB device, and, while waiting for said actual responses from the USB device, in response to said host computer attempting to send another USB packet to said USB device via said upstream mechanism, said upstream mechanism sending said another USB packet to said USB device only if said another USB packet is not on the list of sent USB packets, otherwise said upstream mechanism (a) discarding said another USB packet, and (b) sending at least one other spoofed response to said host computer; and
    providing at least some of the actual responses to the host computer.

2. A method as in claim 1 further comprising:
    removing said USB packets from the list of sent USB packets.

3. A method of communicating with a universal serial bus (USB) device connected to a host computer, the method comprising, by an upstream mechanism:
    obtaining a USB token from the host computer;
    sending the USB token downstream towards the USB device;
    sending at least one spoofed response to the host computer;
    adding said USB token to a list of sent USB tokens;
    waiting for an actual response from the USB device, and, while waiting for said actual response from the USB device, responsive to said host computer attempting to send a second USB token to said USB device via said upstream mechanism, sending said second USB token to said USB device only if said second USB token is not on the list of sent USB tokens, otherwise (a) discarding said second USB token, and (b) sending at least one other spoofed response to said host computer; and
    providing the actual response to the host computer.

4. A method as in claim 3 wherein the token is selected from the group of tokens consisting of: OUT token, IN token, SOF, token, SETUP token and DATA token.

5. A method as in claim 3 wherein the spoofed response is selected from the group of tokens consisting of an ACK token and a NAK token and known bad data.

6. A method as in claim 3 wherein the actual response is selected from the group of handshake tokens consisting of: ACK token; NAK token;
STALL token, and NYET token.

7. A method as in claim 3 wherein the USB token is an IN token and the at least one spoofed response is a NAK token.

8. A method as in claim 7 further comprising:
    upon receipt of the actual response from downstream, sending an acknowledgement token to a downstream mechanism.

9. A method as in claim 3 wherein the USB token is a SETUP token and the at least one spoofed response is an ACK token.

10. A method as in claim 3 wherein the USB token is an OUT token and the at least one spoofed response is selected from the group of responses consisting of: a NAK token and known bad data.

11. A method as in claim 10 wherein the known bad data comprise data with a bad cyclic redundancy check (CRC).

12. A method as in claim 3 further comprising:
    upon receipt of the actual response from downstream, storing the actual response and associating the actual response with the USB token, wherein said providing comprises:
    providing the stored actual response.

13. A method as in claim 3 further comprising, by a downstream mechanism:
    receiving a USB token from an upstream mechanism;
    providing the USB token to the USB device;
    obtaining an actual response from the USB device;
    sending the actual response upstream;
    storing a copy of the actual response, and
    sending an acknowledgement token to the USB device.

14. A method as in claim 13 further comprising:
    in response to an acknowledgement token from upstream, deleting the stored copy of the actual response.

15. A method as in claim 3 further comprising:
    while waiting for the actual response, sending at least one other spoofed response to the host computer.

16. A method as in claim 3 further comprising:
    upon receipt of the actual response from downstream, removing said USB token from the list of sent USB tokens.

17. A method of communicating with a universal serial bus (USB) device connected to a host computer, the method comprising:
    by an upstream mechanism,
        obtaining a USB token from the host computer;
        sending the USB downstream towards the USB device;
        adding said USB token to a list of sent USB tokens;
        sending at least one spoofed response to the host computer;
        waiting for an actual response from the USB device, and, while waiting for said actual response from the USB device, responsive to said host computer attempting to send a second USB token to said USB device via said upstream mechanism, said upstream mechanism sending said second USB token to said USB device only if said second USB token is not on the list of sent USB tokens, otherwise (a) discarding said second USB token, and (b) sending at least one other spoofed response to said host computer; and
        providing the actual response to the host computer; and
    by a downstream mechanism:

receiving the USB token from the upstream mechanism;
providing the USB token to the USB device;
obtaining a response from the USB device; and
sending the response from the USB device upstream as the actual response.

18. A method of communicating with a universal serial bus (USB) device connected to a host computer, the method comprising, by an upstream mechanism:
obtaining a USB OUT token from the host computer;
sending the USB OUT token downstream;
adding said USB OUT token to a list of sent USB tokens;
sending a spoofed response to the host computer;
obtaining a USB DATA token from the host computer;
sending the USB DATA token downstream;
adding said USB DATA token to a list of sent USB tokens;
waiting for an actual response from the USB device, and, while waiting for said actual response from the USB device, responsive to said host computer attempting to resend said USB OUT token and said USB DATA token to said USB device via said upstream mechanism, said upstream mechanism sending said USB OUT token and said USB DATA token to said USB device only if said USB OUT token and said USB DATA token are not on the list of sent USB tokens, otherwise (a) discarding said USB OUT token and said USB DATA token, and (b) sending at least one other spoofed response to said host computer; and
providing the actual response to the host computer.

19. A universal serial bus (USB) connector system comprising:
(A) an upstream mechanism connectable to a USB port of a host computer;
(B) a downstream mechanism connectable to at least one USB device; and
(C) a connection link connecting the upstream and downstream mechanisms, wherein
the upstream mechanism is constructed and adapted to:
(a) obtain a USB token from a host computer connected to the upstream mechanism;
(b) send the USB downstream towards downstream mechanism and add said USB token to a list of sent USB tokens;
(c) send at least one spoofed response to the host computer;
(d) wait for an actual response from the USB device, and, while waiting for said actual response from the USB device, responsive to said host computer attempting to send a second USB token to said USB device via said upstream mechanism, to send said second USB token to said USB device only if said second USB token is not on the list of sent USB tokens, otherwise to (i) discard said second USB token, and (ii) send at least one other spoofed response to said host computer; and
(e) provide the actual response to the host computer.

20. A USB connector system as in claim 19 wherein the downstream mechanism is constructed and adapted to:
receive a USB token from an upstream mechanism;
provide the USB token to a USB device connected to the downstream mechanism;
obtain an actual response from the USB device;
send the actual response upstream; and
send an acknowledgement token to the USB device.

21. A USB connector system as in claim 19 wherein the connection link comprises a fiber cable connected to the upstream mechanism by an upstream transceiver and to the downstream mechanism by a downstream transceiver.

22. A USB connector system as in claim 19 wherein the cable is between 100 meters and 750 meters long.

23. A USB connector system as in claim 19 wherein the upstream mechanism the downstream mechanism and the connection link are packaged in a single cable.

24. A universal serial bus (USB) connector system as in claim 19 wherein the connection link comprises a cable exceeding 300 meters in length.

* * * * *